Figure 1:
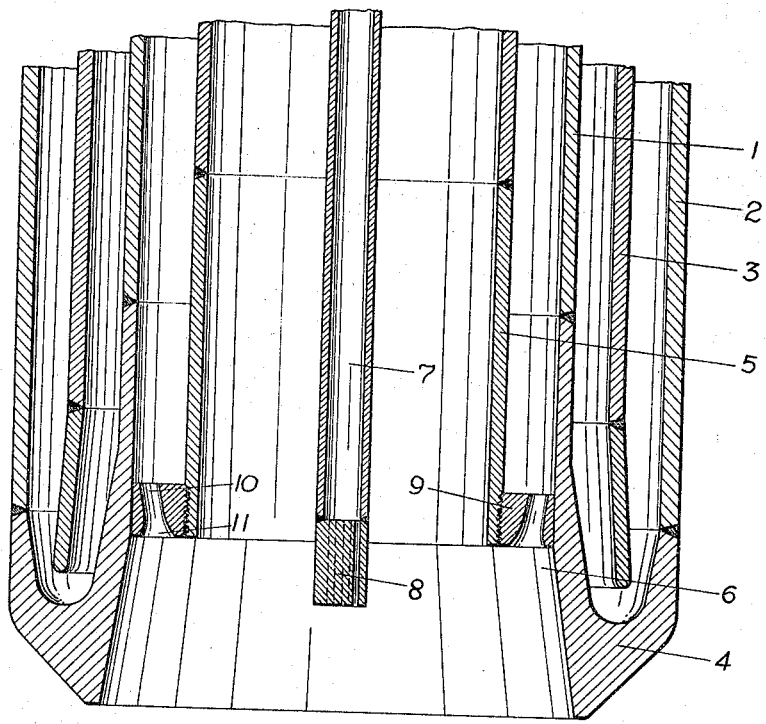

May 2, 1967

R. RINESCH 3,317,309

METHOD FOR MELTING ARTIFICIAL SCRAP

Filed Nov. 22, 1963

INVENTOR
RUDOLF RINESCH
BY
ATTORNEY

United States Patent Office 3,317,309
Patented May 2, 1967

3,317,309
METHOD FOR MELTING ARTIFICIAL SCRAP
Rudolf Rinesch, Linz, Austria, assignor to Vereinigte Österreichische Eisen- und Stahlwerke Aktiengesellschaft, Linz, Austria, a company of Austria
Filed Nov. 22, 1963, Ser. No. 325,591
Claims priority, application Austria, Nov. 30, 1962, A 9,429/62
4 Claims. (Cl. 75—43)

This invention relates to a process for melting direct process iron particles, sponge iron and suchlike artificial scrap and to an apparatus for carrying out the process. As used in the specification and claims herein, the term "iron-containing material" is used to mean finely divided iron-containing charge material, such as direct process iron particles, sponge iron, solid ferrous charge materials, such as reduced iron ore in particulate form, and high iron solid charge materials in granular form.

In top-blowing refining processes, it has already been proposed to introduce by a free fall solid materials into the region of the surface reaction field of the oxygen with the crude iron bath. These proposals had the object to enable the introduction of finely divided basic substances, such as lime, or of solid fuels, into the interior of the burning area or reaction zone without exposing the supply conduits for the solid admixtures to an undue wear. This known process and the apparatus proposed for carrying it out were not suitable, however, for an introduction of ferrous charge materials, such as scrap.

It is desired to find an efficient method for melting direct process iron particles, sponge iron and suchlike artificial scrap, so as to obtain a molten product which is capable of being converted to steel. Thus, the field of application of the oxygen top-blowing processes can be extended, liquid crude iron can be entirely or partly replaced by solid charge materials, and the need for charging bulky scrap, which can be charged only with high handling and labor costs, can be eliminated. The use of direct or Renn process iron particles or sponge iron or suchlike artificial scrap as charge materials has the advantage that these materials are finely divided or granular so that they can be handled with charging machines.

The previous attempts to melt up direct or Renn process iron particles or similar granular or finely divided, solid ferrous charge materials have not had a satisfactory result. It has been attempted, for instance, to form a charge from 50% liquid steelmaking crude iron and 50% direct or Renn process iron particles and to convert this charge into steel. The direct process iron particles were charged onto the bottom of a top-blowing crucible and liquid crude iron was charged onto the direct process iron particles. It was attempted to heat the crude iron bath to the refining temperature by means of a heating and refining nozzle, which discharges oil and oxygen at the same time, and then to refine the bath after the supply of fuel had been discontinued. When the crucible was tipped, however, it was found that the charged direct process iron particles had remained almost unfused at the bottom of the crucible. This may be explained by the fact that the direct process iron contains occluded air, which forms a large number of insulating layers and prevents a sufficient heat transfer. In another attempt to form a charge of 50% liquid steelmaking crude iron and 50% direct or Renn process iron particles, the crude iron was charged first and blown with oxygen for a short preliminary period. Then the direct process iron particles were continuously charged by a chute and the charge was heated at the same time by means of a heating and refining nozzle, which supplied oxygen and oil. This attempt failed also to give the desired result. A part of the direct process iron particles adheres to the wall of the crucible and the larger part forms on the crude iron bath a highly viscous cover, which inhibits the heat transfer from the flame to the bath. In spite of the refining reactions taking place on the exposed central area of the bath surface and in spite of the supply of surplus heat by a combustion of oil, it was not possible to fuse up the direct process iron particles entirely. Besides, the refining action on the liquid bath portions was not uniform and the charge was ultimately over-refined. Nevertheless, the tapping temperature was too low and the removal of sulphur was relatively poor.

It is an object of the invention to avoid the described disadvantages and difficulties. The invention resides essentially in that the said materials are introduced by a free fall, enveloped in a flame, into the region of the zone of reaction of the oxygen with a ferrous bath.

Apparatus in which the said charge materials can be introduced by a free fall into the region of the zone of reaction of an oxygen jet with a ferrous bath are based on the known type of apparatus which comprise a water-cooled blowing tube, a gravity tube centrally disposed in the blowing tube and, if desired, a fuel supply tube centrally disposed in the gravity tube. The known apparatus of this kind are not suitable for charging direct or Renn process iron particles, sponge iron and suchlike artificial scrap, particularly because the ratio of the cross-section of the gravity tube to that of the annular oxygen blowing tube was not designed for the introduction at such a high rate as is required when charging artificial scrap.

For this reason the invention teaches to reduce or constrict the annular free cross-section of the outlet of the oxygen blowing tube by an annular insert formed with bores spaced around the periphery so that the hollow-conical or hollow-cylindrical oxygen jet is divided into a circular series of individual oxygen jets. The annular insert has preferably 4 to 12 bores, and the ratio of the cross-section of the gravity tube to the total cross-section of the bores may preferably be about 25:1 to 25:3.

Under these conditions, the annular series of the individual oxygen jets form in the carbon monoxide atmosphere of a refining crucible a flame envelope, which surrounds the freely falling direct process iron particles charged at the same time through the gravity tube. This effect is promoted by an additional supply of oil or gas through the central fuel supply tube.

The above-mentioned bores in the annular insert are preferably inclined to the longitudinal axis of the blowing device so that the axes of the ducts intersect at a distance of 90–150 cm. below the outlet of the blowing device. This is the normal distance of the lance from the bath surface. It has been found that under such conditions the direct process iron particles will be fused up without difficulty and a formation of covers, skulls etc. inhibiting the heat transfer will be prevented under such conditions.

In a series of experimental melting operations carried out in converters having a capacity of 5 metric tons and 30 metric tons, respectively, 19–30% of direct process iron particles were charged to liquid steelmaking crude iron. The direct process iron particles contained 1.46% C, 0.16% Si, 0.070% Mn, 0.080% P, 0.230% S, 1.36% $Fe_2O_3$, 0.87% $SiO_2$ and 94.21% Fe. The particle size was 0–8 mm. Oil was charged in an amount of 24–35 kg. per metric ton of the charge during a period of 18 minutes.

The steelmaking pig iron had the following composition: 4.0–4.2% C, 0.5–0.7% Si, 1.6–1.8% Mn, 0.15–0.20% P, 0.034–0.056% S. The course of the heat will be explained in the following report:

BLOWING LIQUID STEELMAKING CRUDE IRON CONTAINING 30% DIRECT PROCESS IRON PARTICLES IN THE METALLIC CHARGE INTO STEEL

Charge:

|   | Kg. |
|---|---|
| Crude iron | 4,140 |
| Direct process iron particles | 1,800 |
| Ferro-alloys | 40 |
|   | 5,980 (=100.0%) |
| Yield | 5,260 (=88.0%) |

Admixtures:

| Lime | 450 |
|---|---|
| Bauxite | 30 |

Ladle admixtures:

| FeMn (75.6%) | 9 |
|---|---|
| FeSi (75.1%) | 23 |
| Al | 8 |

*Course of operation*

|   | Minutes |
|---|---|
| Charging of crude iron | 3.10 |
| Preliminary refining | 6.00 |
| Continuous supply of direct process iron particles through gravity tube and simultaneous supply of heat | 18.00 |
| Final refining | 2.00 |
| Submerged temperature measurement, sampling | 6.50 |
| Tapping | 2.00 |
|   | 37.60 |

|   | Sample from charged crude iron | Direct process iron particles | Sample taken before tapping | Finished sample |
|---|---|---|---|---|
| Analyses, percent: |   |   |   |   |
| C | 4.22 | 1.46 | 0.07 | 0.08 |
| Si | 0.61 | 0.16 |  | 0.16 |
| Mn | 1.78 | 0.07 | 0.19 | 0.27 |
| P | 0.150 | 0.080 | 0.014 | 0.015 |
| S | 0.056 | 0.230 | 0.048 | 0.050 |
| N |  |  |  | 0.004 |
| O |  |  | 0.051 |  |
| Submerged temperature measurement, °C | 1,195 |  | 1,615 |  |

Heat consumption: 341,000 kilocalories per metric ton of liquid crude steel.

300 kg. lime in lump form and 150 kg. of lime powder were introduced as the 450 kg. lime admixture together with the direct process iron particles into the crucible in the formation of another charge having the same composition. Thereby, desulphurization was further improved and amounted to 70–77%.

In another charge, the lime powder was replaced by milk of lime (aqueous $Ca(OH)_2$). The desulphurization amounted to 75–85%.

An apparatus for carrying out the process according to the invention is shown in more detail by way of example in the drawing. FIG. 1 is a vertical sectional view and FIG. 2 a fragmentary horizontal sectional view taken on line A—A.

The apparatus comprises an oxygen blowing tube 1, which is surrounded by an outer cooling jacket 2. These parts are integrally connected to the mouthpiece 4, which consists of solid material to form a nozzle outlet, which in the example shown has a diverging configuration. A guide tube 3 is arranged in the jacket space between the oxygen tube 1 and the jacket 2 to form a cooling fluid cycle. A gravity tube 5 for the solid admixtures is centrally incorporated in the blowing tube and is flush with the inlet and of the diverging nozzle section 6 of the blowing tube. A fuel supply tube 7 is disposed within the gravity tube 5. A swirling member 8 inserted in the outlet of the tube 7 has helical convolutions to cause a good atomization of the fuel which is supplied.

Figure 2:
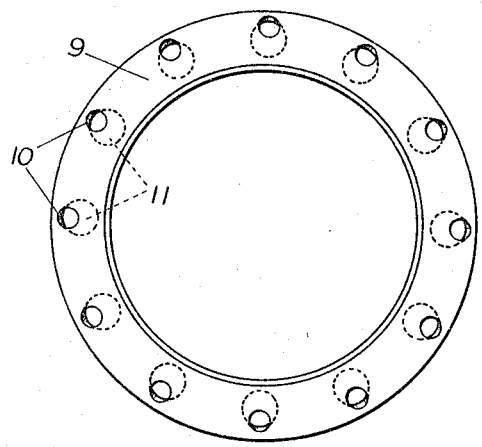

According to the invention an annular insert 9 is adapted to be inserted into the annular outlet of the oxygen blowing tube 1. This annular insert 9 has bores 10, which are inclined to the longitudinal axis of the blowing device. FIG. 2 is a horizontal sectional view showing such an annular insert having twelve regularly spaced bores. As is shown in FIG. 1, the bores have preferably a diverging outlet section 11 so that each bore constitutes a Laval nozzle. The ratio of the cross-section of the gravity tube to that of the fuel supply tube and to that of the bores of the annular inserts may be varied within wide limits in dependence on the amount of the solid charge materials and the desired temperature. The preferred ratio of the cross-section of the gravity tube to that of the bores is about 25:1.

The annular insert constricts the oxygen stream. The oxygen is discharged from the blowing tube in the form of individual jets, which intersect at a distance of 90–150 centimeters below the outlet of the blowing device. This distance depends on the inclination of the bores. As a result, the direct process iron particles or fine-grained sponge iron particles introduced through the gravity tube 5 enter the region which is at the highest reaction temperature and are rapidly fused up.

When the melting process of the invention is used, e.g., for preparing a molten charge, which is converted into steel in a top-blowing process by refining with substantially pure oxygen, the following advantages will, inter alia, be achieved:

(1) The handling of the direct process iron particles and their charging into the crucible may be mechanically and automatically performed.

(2) The expenses involved in the preliminary processing of scrap are eliminated; space is saved because the need for a storage of scrap is eliminated; the load on the crane installations is reduced.

(3) The charging time and with it the length of the refining cycle is reduced.

(4) If the process is carried out automatically, the spectral analysis of the crude iron may be used for an exact determination of the admixture of direct process iron particles or sponge iron so that a proper composition is more reliably obtained and the variation of the tapping temperature is reduced.

(5) The temperature of the charge can be regulated by a variation of the rate at which direct process iron or sponge iron is conveyed.

(6) A constant amount of return scrap may be charged as a basic load whereas the direct process iron particles may be charged as a supplemental load depending on the crude iron analysis and temperature.

What I claim is:

1. A method for melting up particles of iron-containing materials prior to refining in a metallurgical vessel by a top blowing process comprising introducing particles of iron-containing materials by free fall into the area of the zone of reaction of an oxygen stream with a ferrous melt in the metallurgical vessel, and causing a flame formed by the oxygen stream and a stream of fuel to envelop the particles of iron-containing material during their introduction into the vessel.

2. The method as set forth in claim 1 including the step of directing lime powder into the vessel simultaneously and in mixture with the particles of iron containing material.

3. The method set forth in claim 1 including the step of directing a material which releases hydrogen upon heating into the vessel simultaneously and in mixture with the particles of iron-containing material.

4. A method for melting up particles of iron-containing material prior to refining in a metallurgical vessel by a top blowing process comprising directing particles of iron-containing material by free fall through a conduit substantially centrally toward a metallurgical vessel and into the area of the zone of reaction of an oxygen stream with a ferrous melt in the vessel, directing oxygen into the vessel from a blowing means surrounding the conduit and simultaneously supplying a stream of fuel into the upper part of the vessel so as to form a flame which envelops the freely falling particles of iron-containing material before they reach the area of the zone of reaction of the oxygen and the ferrous melt in the vessel.

References Cited by the Examiner

UNITED STATES PATENTS

| | | | |
|---|---|---|---|
| 2,526,658 | 10/1950 | Harman et al. | 75—38 |
| 2,669,511 | 2/1954 | Whitney | 75—43 |
| 2,671,724 | 3/1954 | Kompart | 75—43 |
| 2,863,656 | 12/1958 | Cox | 266—41 |
| 2,950,186 | 8/1960 | Allard et al. | 75—52 |
| 2,969,282 | 1/1961 | Churcher | 75—52 X |
| 2,988,443 | 6/1961 | Metz | 75—52 |
| 3,060,014 | 10/1962 | Aihara | 75—43 |
| 3,071,363 | 1/1963 | Mackay | 266—41 |
| 3,201,105 | 8/1965 | Miller | 75—60 X |
| 3,212,880 | 10/1965 | Rinesch | 75—52 |
| 3,241,825 | 3/1966 | Jelek et al. | 75—60 X |

HYLAND BIZOT, *Primary Examiner.*

WINSTON A. DOUGLAS, DAVID L. RECK,
*Examiners.*

W. C. TOWNSEND, H. W. TARRING,
*Assistant Examiners.*